(12) United States Patent
Todaka et al.

(10) Patent No.: US 8,454,211 B2
(45) Date of Patent: Jun. 4, 2013

(54) VEHICLE HEADLAMP

(75) Inventors: Shinichi Todaka, Wako (JP); Toshihisa Miyazaki, Wako (JP); Takamichi Yabuzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 13/029,080

(22) Filed: Feb. 16, 2011

(65) Prior Publication Data

US 2011/0235358 A1 Sep. 29, 2011

(30) Foreign Application Priority Data

Mar. 23, 2010 (JP) ................................. 2010-066923

(51) Int. Cl.
*B60Q 1/00* (2006.01)
*B60Q 3/00* (2006.01)
*B60Q 11/00* (2006.01)

(52) U.S. Cl.
USPC ............................ 362/459; 362/549; 362/507

(58) Field of Classification Search
None
See application file for complete search history.

(56) References Cited

U.S. PATENT DOCUMENTS 7,322,639 B2 * 1/2008 Takata et al. .................. 362/507

FOREIGN PATENT DOCUMENTS

JP 3597606 B2 2/1997

* cited by examiner

*Primary Examiner* — Britt D Hanley
(74) *Attorney, Agent, or Firm* — Ditthavong Mori & Steiner, P.C.

(57) ABSTRACT

A vehicle headlamp to project light forward from a vehicle includes a headlamp housing supported by a vehicle body and supporting a lens. A headlamp mounting portion is disposed on an upper portion of the headlamp housing. An extending contact portion is continuous with the headlamp mounting portion. A headlamp pressing portion is disposed below the headlamp mounting portion. A first bracket has a first end portion and a second end portion. The first end portion is attached to a body mount of the vehicle body together with the headlamp mounting portion. The second end portion is attached to the headlamp pressing portion. A second bracket has a first portion and a second portion. The first portion is attached to the body mount together with the headlamp mounting portion and the first end portion. The second portion is close to the extending contact portion.

4 Claims, 9 Drawing Sheets

VEHICLE HEADLAMP

CROSS-REFERENCE TO RELATED APPLICATIONS

The present application claims priority under 35 U.S.C. §119 to Japanese Patent Application No. 2010-066923, filed Mar. 23, 2010, entitled "Vehicle Headlamp". The contents of this application are incorporated herein by reference in their entirety.

BACKGROUND OF THE INVENTION

1. Field of the Invention

The present invention relates to a vehicle headlamp.

2. Description of the Related Art

There is a type of headlamp that has an attachment stay that tilts when subjected to an impact force due to a collision and thereby absorbs the impact force (see, for example, Japanese Patent No. 3597606).

However, with this existing technology (Japanese Patent No. 3597606), the structure, which includes the stay for supporting the headlamp, is complex, and the manufacturing cost is high. Moreover, the headlamp might be displaced (the angle of the optical axis of the headlamp might be changed) in a low speed collision. It is desirable to provide a headlamp that is not easily displaced in a low speed collision and that has a simple structure (lightweight).

SUMMARY OF THE INVENTION

According to one aspect of the invention, a vehicle headlamp to project light forward from a vehicle includes a headlamp housing, a headlamp mounting portion, an extending contact portion, a headlamp pressing portion, a first bracket, and a second bracket. The headlamp housing is supported by a vehicle body and supports a lens through which the light passes. The headlamp mounting portion is disposed on an upper portion of the headlamp housing. The extending contact portion is continuous with the headlamp mounting portion. The headlamp pressing portion is disposed below the headlamp mounting portion. The first bracket has a first end portion and a second end portion that is continuous with the first end portion. The first end portion is attached to a body mount of the vehicle body together with the headlamp mounting portion. The second end portion is attached to the headlamp pressing portion. The second bracket has a first portion and a second portion that is continuous with the first portion. The first portion is attached to the body mount together with the headlamp mounting portion and the first end portion. The second portion is close to the extending contact portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A, 4B and 4C are perspective views of the vehicle headlamp according to the embodiment, in which FIG. 4A illustrates the entirety of the vehicle headlamp, FIG. 4B is an enlarged view of a region IVB of FIG. 4A, and FIG. 4C is a detailed view of a headlamp mounting portion;

DESCRIPTION OF THE EMBODIMENTS

Figure 1:
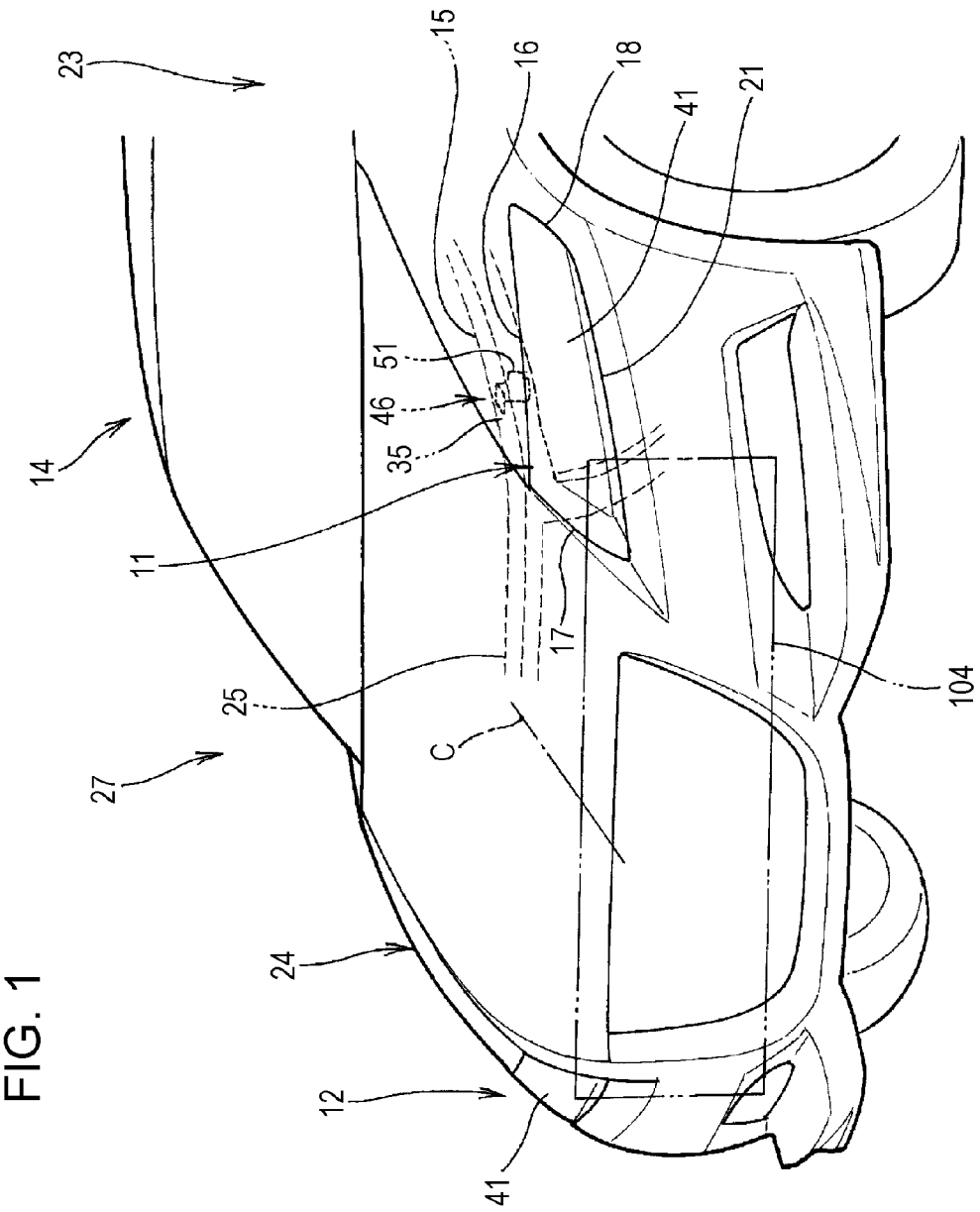
FIG. 1 is a schematic perspective view of a vehicle headlamp according to an embodiment of the present invention.

The embodiments of the present invention will be described in detail with reference to the accompanying drawings, wherein like reference numerals designate corresponding or identical elements throughout the various drawings.

Figure 2:
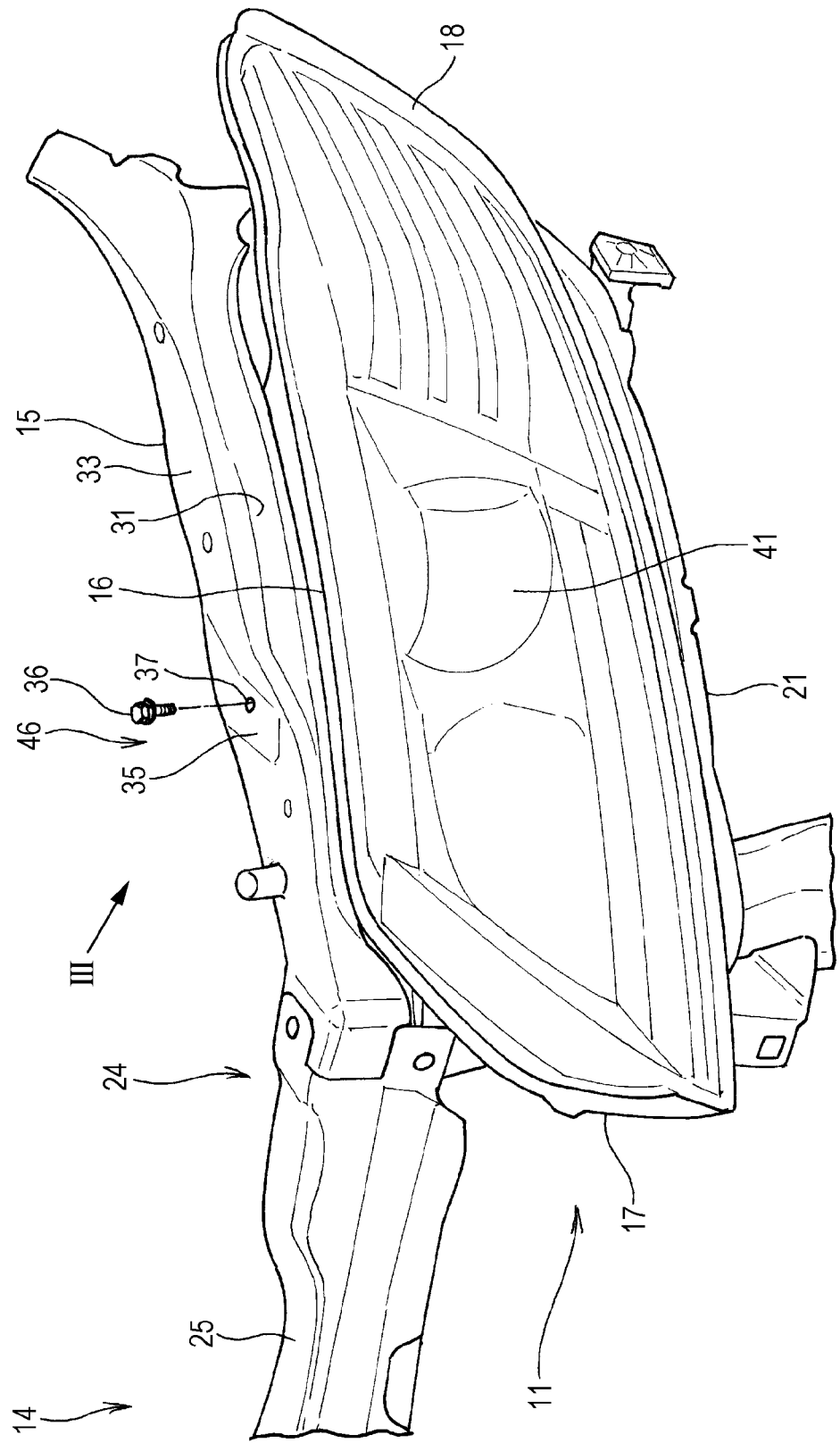
FIG. 2 is a perspective view illustrating how the vehicle headlamp according to the embodiment is attached.
Figure 3:
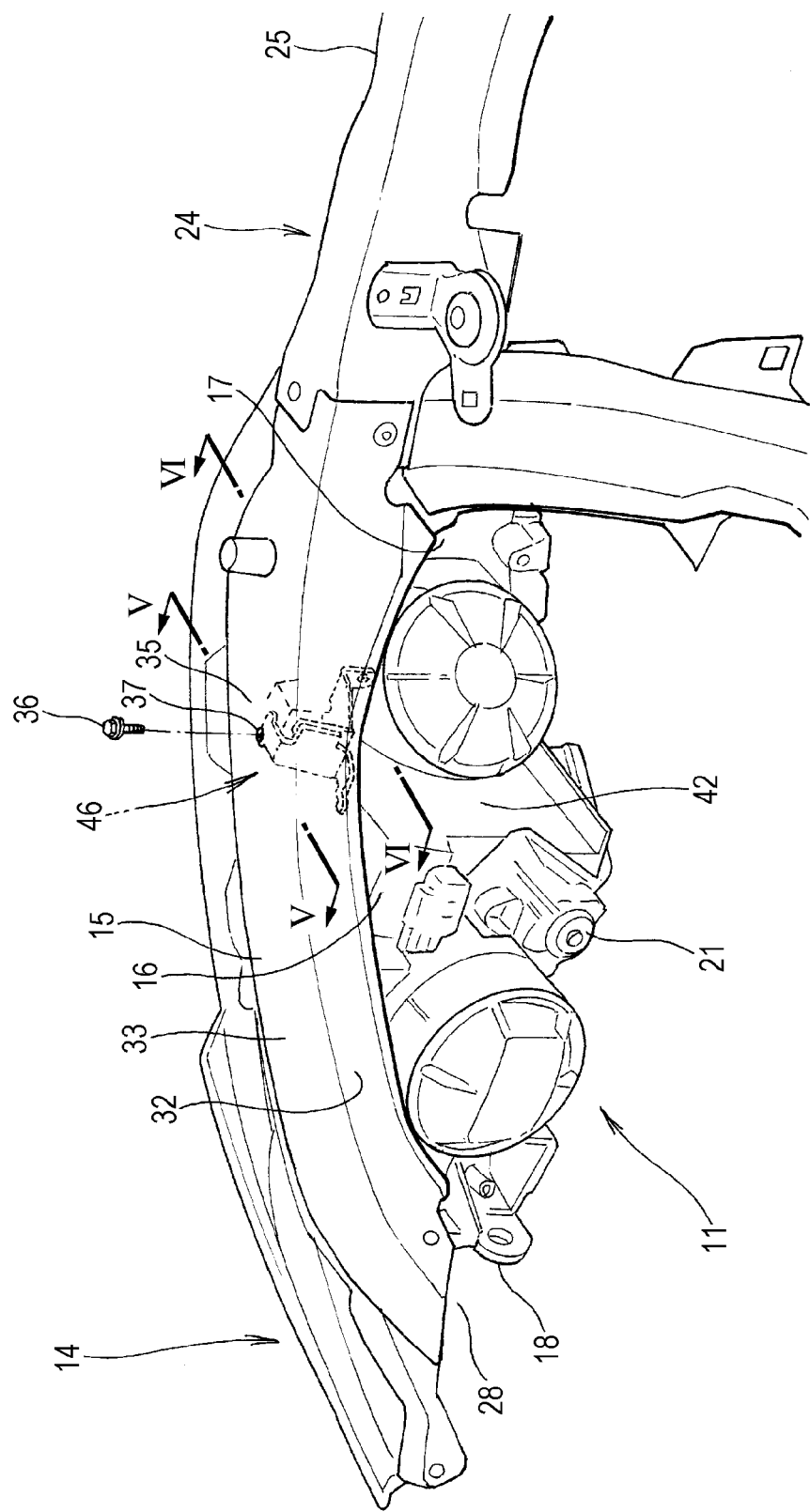
FIG. 3 is a view of FIG. 2 in the direction of arrow III.

As illustrated in FIGS. 1 to 3, an upper side portion 16 of each of vehicle headlamps 11 and 12 according to the embodiment is attached to a corresponding one of upper side bulkheads 15 of a vehicle body 14. Moreover, an inner side portion 17, an outer side portion 18, and a lower side portion 21 of each of the vehicle headlamps 11 and 12 are attached to the vehicle body 14, as will be described below in detail.

The vehicle body 14 includes a front body 24 in front of a cabin 23. The front body 24 includes the upper side bulkheads 15 and an upper center bulkhead 25. The upper side bulkheads 15 and the upper center bulkhead 25 are substantially symmetrical about the center (reference line C) of a vehicle 27. Hereinafter, the left side of the vehicle body 14 will be described.

Figure 5:
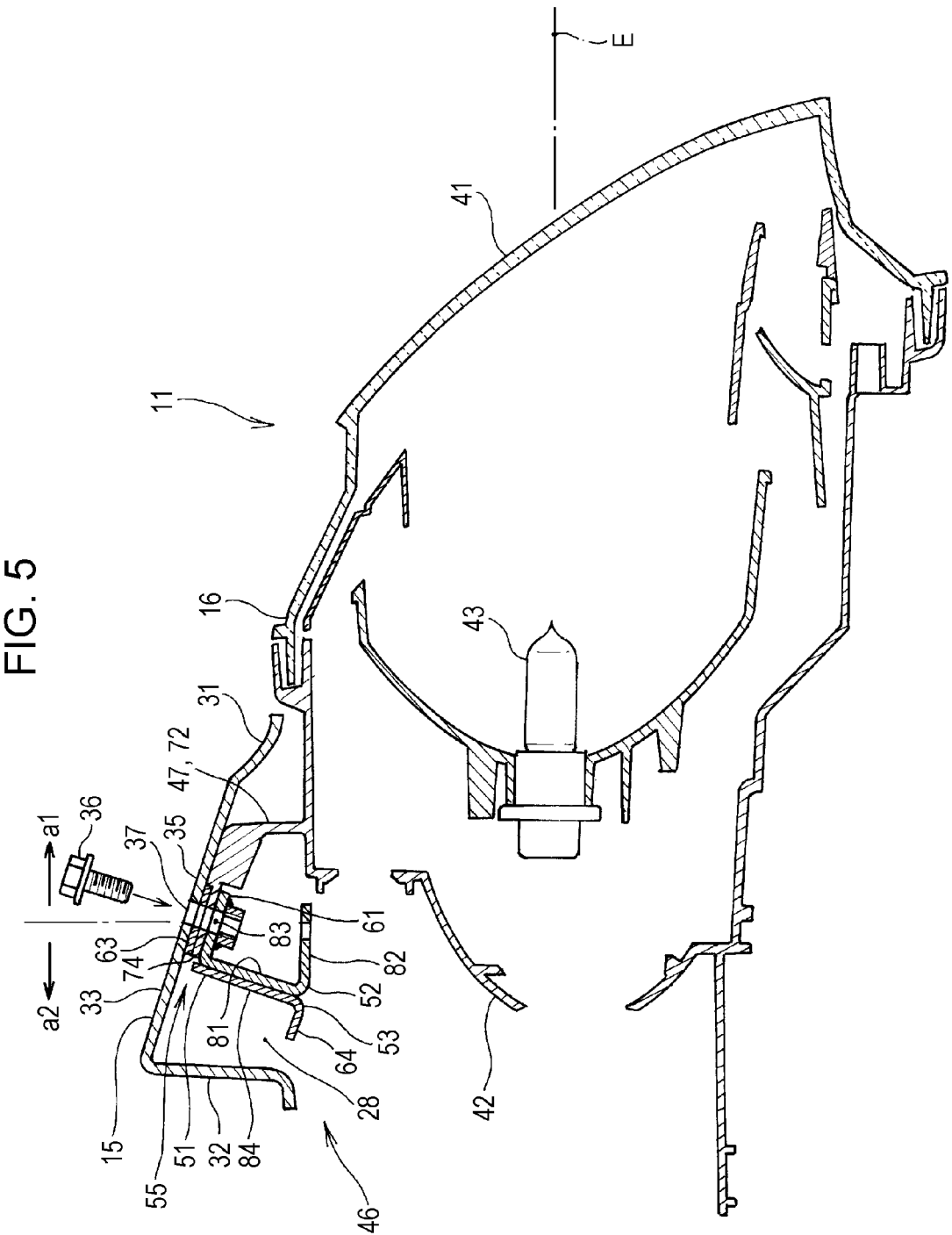
FIG. 5 is a sectional view taken along line V-V of FIG. 3.

As illustrated in FIGS. 2, 3, and 5, the upper side bulkhead 15 has a groove-like shape and an opening 28 of the upper side bulkhead 15 faces toward the bottom of the vehicle 27.

The groove-like shape of the upper side bulkhead 15 is formed by an outer wall 31, an inner wall 32, and an upper wall 33. A body mount 35 is formed at the center of the upper side bulkhead 15 in the longitudinal direction, and an upper hole 37 for inserting a bolt 36 is formed in the body mount 35. A part of the upper side portion 16 of the headlamp 11 is fixed with the bolt 36.

Figure 6:
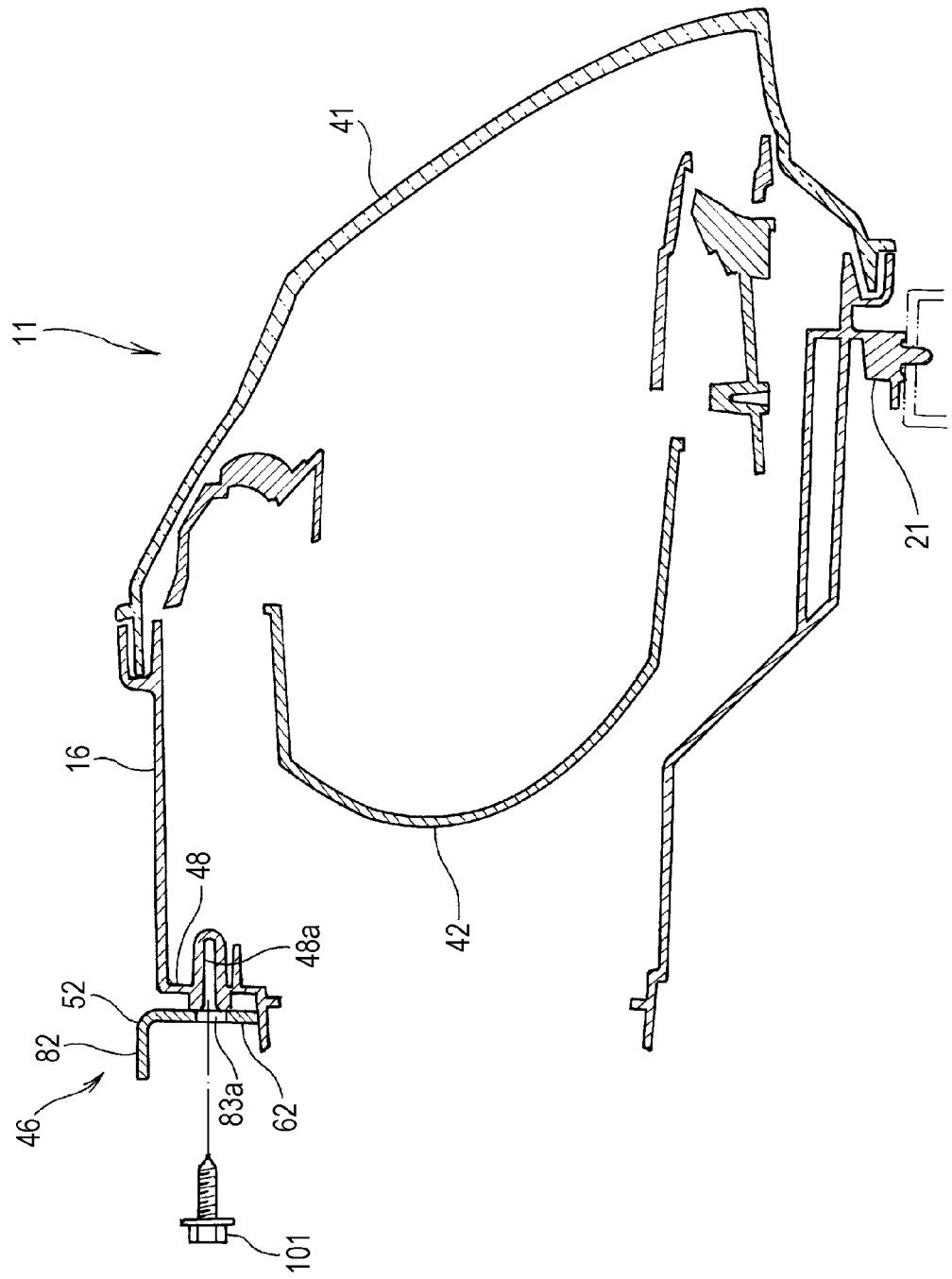
FIG. 6 is a sectional view taken along line VI-VI of FIG. 3.

The headlamp 11 is the left headlamp, and the headlamp 12 is the right headlamp. The headlamps 11 and 12 are symmetrical with respect to the center (reference line C) of the vehicle 27. Referring to FIGS. 2 and 6, the headlamp 11 will be mainly described.

The headlamp 11 includes a lens 41, a headlamp housing 42 that supports the lens 41, and a light bulb 43 disposed in the headlamp housing 42. The headlamp 11 has an optical axis E (FIG. 5). The optical axis E is set at a predetermined angle in a factory.

The headlamp 11 includes an upper support mechanism 46 that supports an upper portion (the upper side portion 16) of the headlamp 11. The upper support mechanism 46 includes a headlamp mounting portion (headlamp stay) 47, a headlamp pressing portion 48 that is disposed below and close to the headlamp stay 47 (see FIG. 6), and a headlamp support member 51 that includes a first bracket 52 and a second bracket 53.

A fastening mount portion 55 (see FIG. 5) is a portion of the headlamp 11 in which the headlamp mounting portion (headlamp stay) 47, the first bracket 52, and the second bracket 53 are superposed on top of one another and fastened with the bolt 36.

Next, referring to FIGS. 1 to 6, the main structure of the headlamp 11 will be described. The vehicle headlamps 11 and 12, which project light forward from the vehicle 27, each include the headlamp housing 42 that is supported by the vehicle body 14. The headlamp housing 42 supports the lens 41, through which the light passes.

The vehicle headlamps 11 and 12 each include the headlamp mounting portion (headlamp stay) 47 disposed on an upper portion (the upper side portion 16) of the headlamp housing 42, an extending contact portion 57 that is continuous with the headlamp mounting portion 47, and the headlamp pressing portion 48 that is disposed below the headlamp mounting portion 47.

The vehicle headlamps 11 and 12 each include the first bracket 52 and the second bracket 53. The first bracket 52 has a first end portion (bulkhead fastening plate) 61 (see FIG. 5) and a second end portion (headlamp fastening plate) 62 that is continuous with the first end portion 61. The first end portion (bulkhead fastening plate) 61 is attached to the body mount 35 of the vehicle body 14 together with the headlamp mounting portion (headlamp stay) 47. The second end portion (headlamp fastening plate) 62 is attached to the headlamp pressing portion 48. The second bracket 53 has a first portion (clamp plate) 63 and a second portion 64 that is continuous with the first portion 63. The first portion (clamp plate) 63 is attached to the body mount 35 together with the headlamp mounting portion (headlamp stay) 47 and the first end portion (bulkhead fastening plate) 61. The second portion 64 is disposed close to the extending contact portion 57.

Figure 4A:
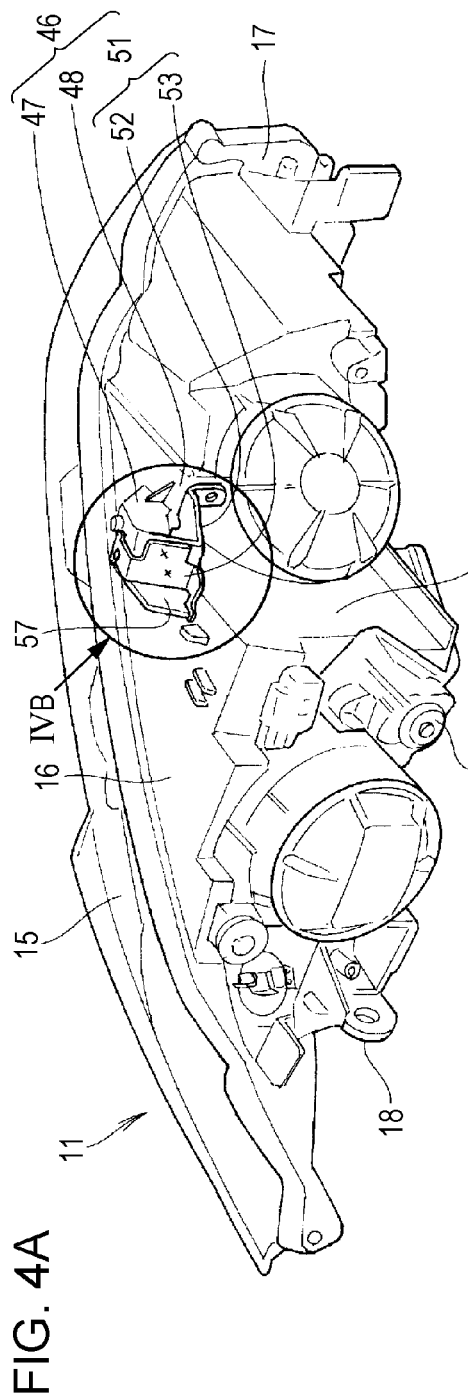

As illustrated in FIGS. 4A to 5, the headlamp mounting portion (headlamp stay) 47 is disposed in front of the body mount 35 (in the direction of arrow a1). The second portion 64 of the second bracket 53 and the extending contact portion 57 are disposed behind the body mount 35 (in the direction of arrow a2).

Figure 4C:
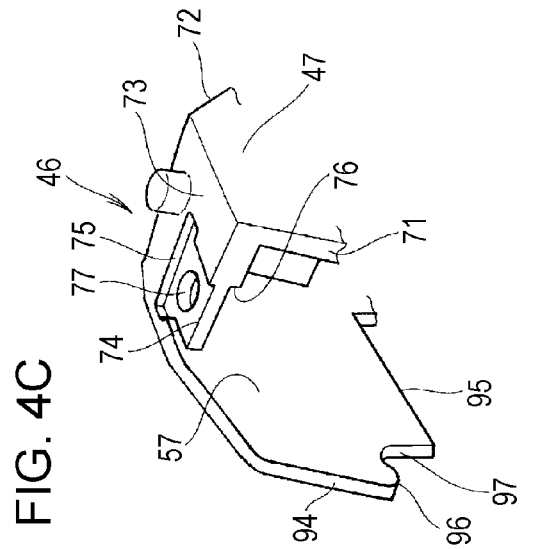
Figure 4B:
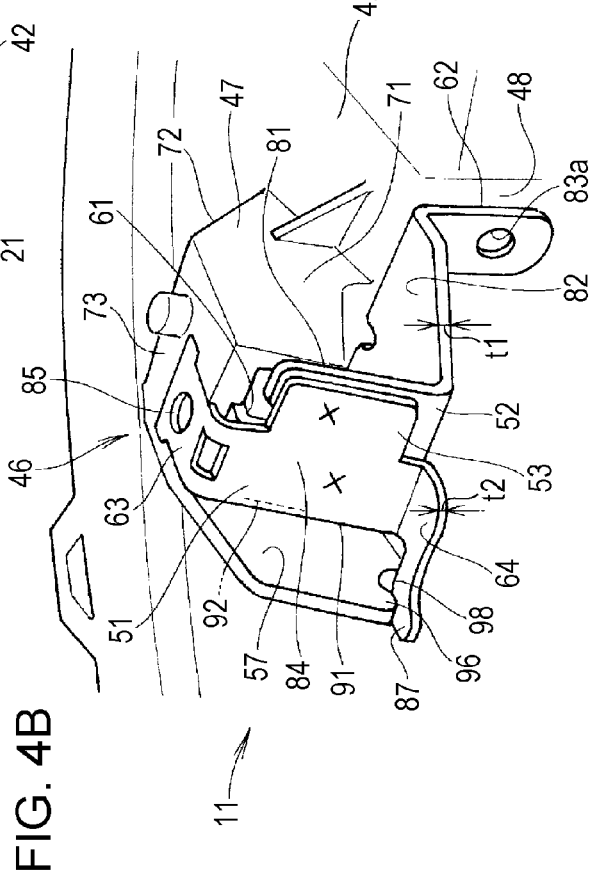

Next, the headlamp 11 will be described in detail. As illustrated in FIGS. 4A to 4C, the headlamp mounting portion (headlamp stay) 47 includes an inner leg portion 71 and a front leg portion 72. The inner leg portion 71 is integrally formed with the headlamp housing 42 so as to extend substantially vertically. The front leg portion 72 is integrally formed with the headlamp housing 42 so as to extend substantially vertically and so as to be perpendicular to the inner leg portion 71. An upper connection portion 73 is formed so as to be continuous with the upper edge of the inner leg portion 71 and the upper edge of the front leg portion 72. A clamp portion 74 is formed in the upper connection portion 73.

The clamp portion 74 has an upper engagement recess 75 that is recessed from the upper surface of the upper connection portion 73 by a depth that corresponds to the thickness t2 of the second bracket 53. The clamp portion 74 has a lower engagement recess 76 that is recessed from the lower surface of the upper connection portion 73 at least by a depth that corresponds to the thickness t1 of the first bracket 52.

A clamp hole 77 for inserting the bolt 36 is formed at the center of the clamp portion 74 so as to be concentric with the upper hole 37 (see FIG. 5). The clamp hole 77 need not be a perfect circle. For example, instead of a circular hole, a slit may be formed so as to extend toward the back of the vehicle. As illustrated in FIGS. 4A to 5, the clamp portion 74 is clamped between the first bracket 52 and the second bracket 53.

The first bracket 52, which is made by plastically deforming a steel plate, has a thickness of t1. The first bracket 52 has the first end portion (bulkhead fastening plate) 61 for pressing the lower engagement recess 76. A first vertical body 81 is formed so as to be continuous with and perpendicular to the bulkhead fastening plate 61 and so as to extend downward from the bulkhead fastening plate 61.

A horizontal body 82 is formed so as to be continuous with the first vertical body 81 and so as to extend toward the front of the vehicle 27. A second end portion (headlamp fastening plate) 62 is formed so as to be continuous with and perpendicular to the horizontal body 82 and so as to extend downward from the horizontal body 82.

A first-end first hole 83 is formed in the first end portion (bulkhead fastening plate) 61 so as to be concentric with the clamp hole 77 in the headlamp mounting portion (headlamp stay) 47. A second-end first hole 83a is formed in the second end portion (headlamp fastening plate) 62.

The second bracket 53, which is made by plastically deforming a steel plate, has a thickness of t2. The thickness t2 is smaller than the thickness t1 of the first bracket 52 (about 60% of t1).

The second bracket 53 includes the first portion (clamp plate) 63 that presses the upper engagement recess 75 and that is pressed against the body mount 35 of the upper side bulkhead 15. A second vertical body 84 is formed so as to be continuous with and perpendicular to the clamp plate 63 and so as to extend downward from the clamp plate 63. The second vertical body 84 is superposed on and welded to the first vertical body 81 (welded portions are indicated by "x" marks in FIG. 4C). A second hole 85 is formed in the first portion (clamp plate) 63 so as to be concentric with the clamp hole 77 in the headlamp mounting portion (headlamp stay) 47.

The second portion 64 is formed so as to be continuous with and perpendicular to the second vertical body 84 and so as to extend from the second vertical body 84 toward the back of the vehicle 27. The second portion 64 includes a rotation limiter 87. The rotation limiter 87 protrudes toward the outside of the vehicle 27 in plan view of the vehicle 27. The rotation limiter 87 protrudes toward the outside of the vehicle 27 with respect to an outer edge 91 of the second vertical body 84 and an outer edge 92 of the first vertical body 81. The extending contact portion 57 contacts the rotation limiter 87 when necessary.

The extending contact portion 57 is disposed close to the outer edge 91 of the second vertical body 84 and the outer edge 92 of the first vertical body 81, and extends toward the back of the vehicle 27 from the headlamp mounting portion (headlamp stay) 47. The extending contact portion 57 has a plate-like shape and faces the inner leg portion 71 of the headlamp mounting portion (headlamp stay) 47.

To be specific, as illustrated in FIG. 4C, a rear end 94 and a lower end 95 intersect at a contact portion 96, and an engagement portion 97 having a U-shape is formed so as to be continuous with the contact portion 96. The engagement portion 97 is formed so as to face downward and so as to be engageable with a front edge 98 of the rotation limiter 87 of the second bracket 53 when necessary.

Next, referring to FIGS. 4A to 6, how the first bracket 52 and the second bracket 53 of the vehicle headlamp 11 are attached will be described briefly. The headlamp support member 51 is made beforehand by welding the first bracket 52 and the second bracket 53 together at the welding portions. At this time, the first-end first hole 83 is positioned so as to be concentric with the second hole 85.

Next, the headlamp support member 51 is attached to the headlamp housing 42 as follows. The clamp portion 74 of the headlamp mounting portion (headlamp stay) 47 is placed between the first end portion (bulkhead fastening plate) 61 of the first bracket 52 and the first portion (clamp plate) 63 of the second bracket 53. The clamp hole 77 is positioned so as to be concentric with the second hole 85.

Then, the second end portion (headlamp fastening plate) 62 of the first bracket 52 is fastened to the headlamp pressing portion 48. A bolt 101 is inserted into the second-end first hole 83a, and screwed into a threaded hole 48a in the headlamp pressing portion 48. Thus, the operation of attaching the first bracket 52 and the second bracket 53 to the headlamp housing 42 is finished.

Next, referring to FIGS. 1 and 7 to 9, the advantage of the vehicle headlamps 11 and 12 will be described. If the front side of the vehicle 27 collides with an obstacle 104 when the vehicle 27 is being driven at a low speed, displacement of the vehicle headlamp 11 or 12 is restrained by resisting an impact (load) due to the collision. The obstacle 104, such as another vehicle, is represented by a two-dot chain line in FIG. 1.

Figure 7:
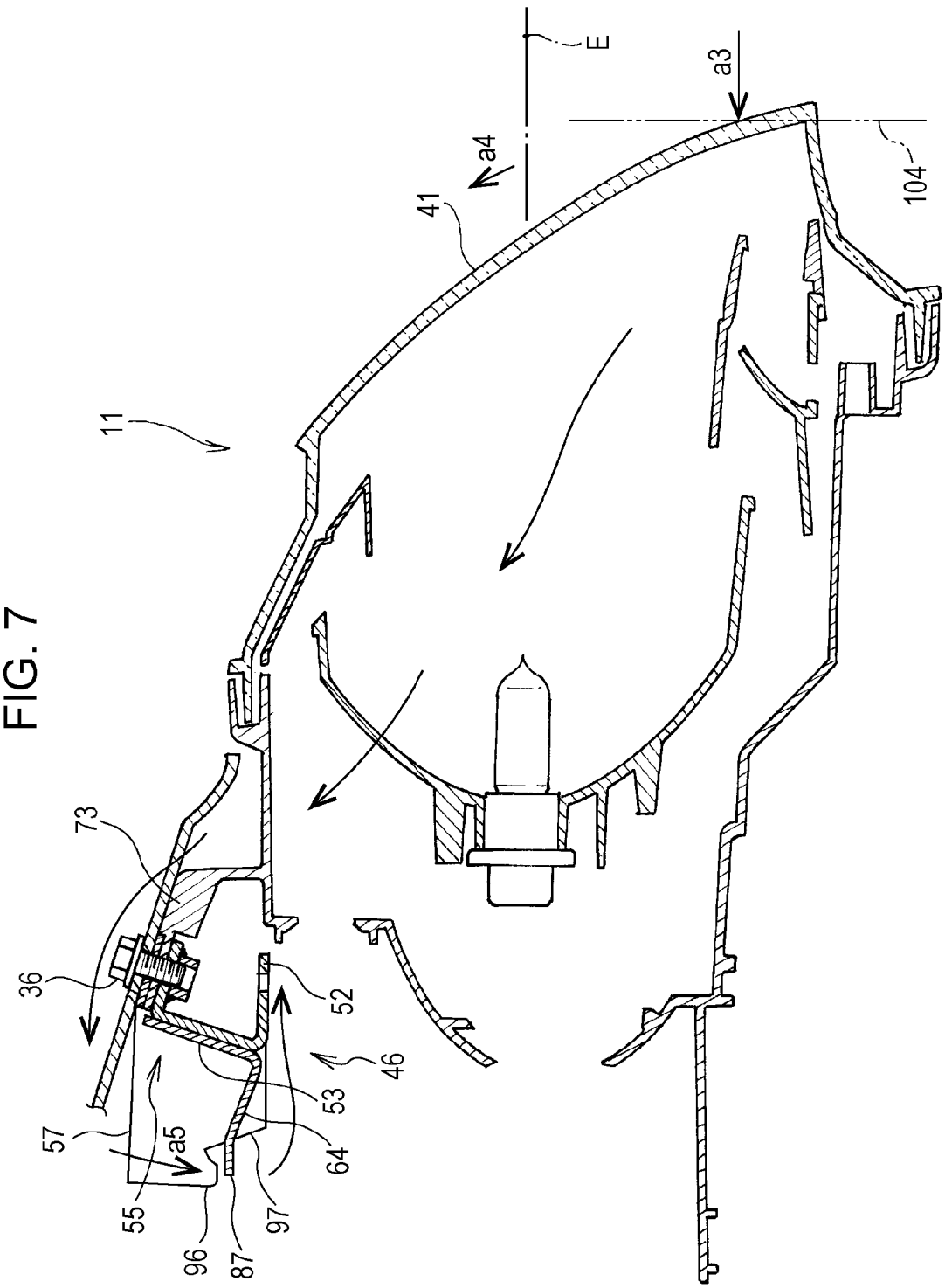
FIG. 7 illustrates a mechanism for restraining rotation of the vehicle headlamp according to the embodiment.

To be specific, as illustrated in FIG. 7, when the headlamp 11 is subjected to a load as indicated by arrow a3, the headlamp 11 starts rotating upward in the direction of arrow a4 under some conditions. The axis of the rotation extends through the fastening mount portion 55 that is fastened with the bolt 36, or more specifically, through the upper connection portion 73 of the headlamp mounting portion (headlamp stay) 47, which is not clamped between the first bracket 52 and the second bracket 53. When the headlamp 11 rotates around this axis, the extending contact portion 57 is rotated as indicated by arrow a5, and the contact portion 96 of the extending contact portion 57 contacts the rotation limiter 87 of the second portion 64 of the second bracket 53, and thereby the rotation of the headlamp 11 is restrained. Therefore, the angle by which the optical axis E of the headlamp 11 is moved upward can be restrained.

Figure 8:
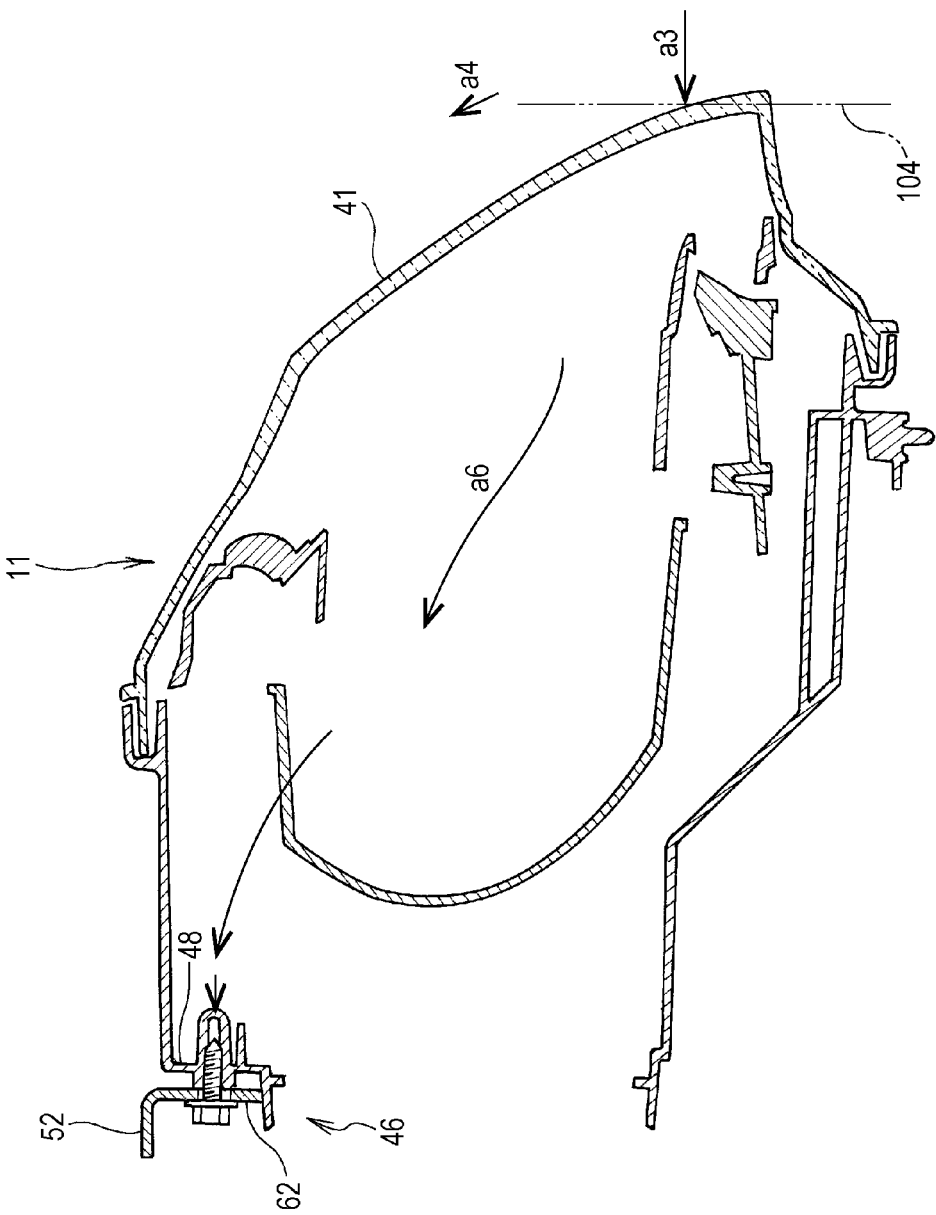
FIG. 8 illustrates a mechanism for restraining backward movement and rotation of the vehicle headlamp according to the embodiment.
Figure 9:
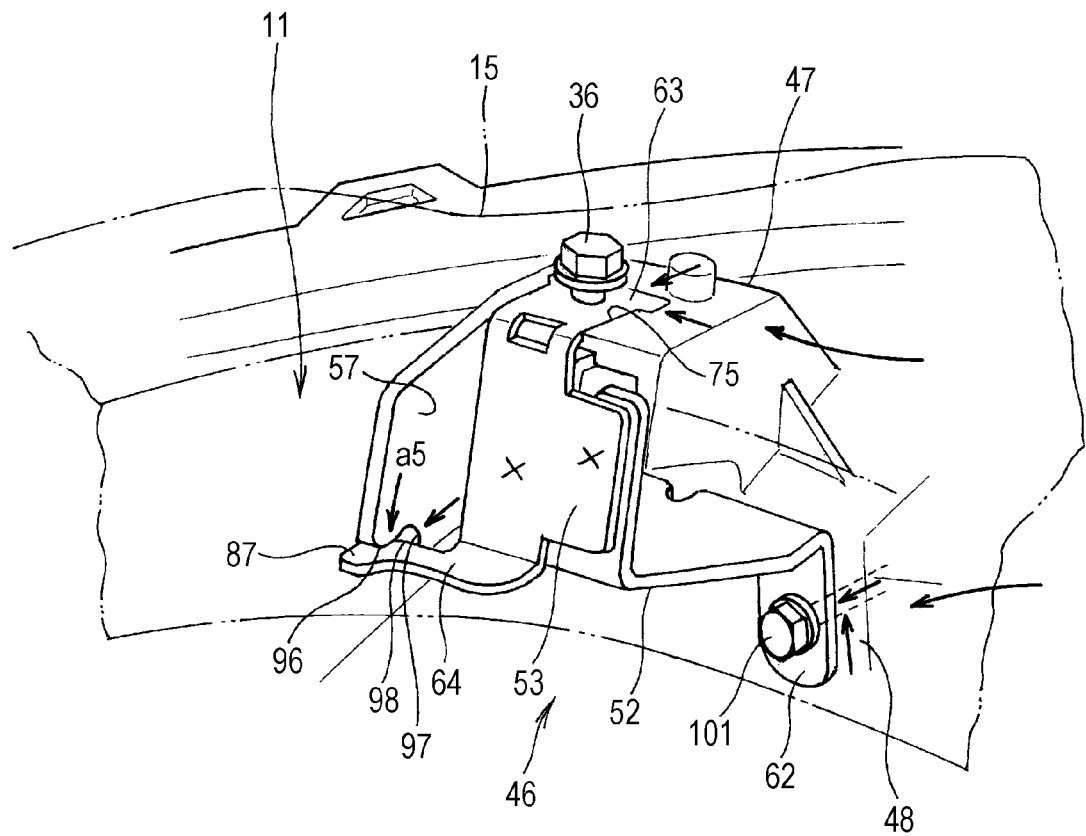
FIG. 9 is a detailed view of the mechanism for restraining backward movement and rotation of the vehicle headlamp.

As illustrated in FIG. 8, when a load due to the collision is transferred to the headlamp housing 42 as indicated by arrow a6, the load is transferred from the headlamp housing 42 to the headlamp pressing portion 48 below and to the second end portion (headlamp fastening plate) 62 of the first bracket 52. As a result, rearward movement and rotation of the headlamp 11 are restrained, whereby the angle by which the optical axis E of the headlamp 11 is changed upward can be restrained.

Thus, even if the headlamp 11 is subjected to a load due to a low-speed collision, displacement of the optical axis E is restrained. Moreover, because the thickness t2 of the second bracket 53 is smaller than the thickness t1 of the first bracket 52, the weight of the headlamp 11 can be reduced.

Furthermore, when the extending contact portion 57 is displaced toward the back of the vehicle 27 while being rotated (in the direction of arrow a5), the engagement portion 97, which is U-shaped, engages with the front edge 98 (see FIG. 4B) of the rotation limiter 87 of the second bracket 53, whereby displacement of the optical axis E can be more reliably restrained.

The lower engagement recess 76, to which the first bracket 52 is fitted, and the upper engagement recess 75, to which the second bracket 53 is fitted, are formed in the headlamp mounting portion (headlamp stay) 47. Therefore, when the headlamp 11 is subjected to an impact (load) due to a low speed collision, the load can be transferred from the lower engagement recess 76 to the first bracket 52 and from the upper engagement recess 75 to the second bracket 53. As a result, displacement of the optical axis E in the direction of the vehicle width can be restrained.

According to the embodiment of the present invention, a vehicle headlamp includes a headlamp housing; a headlamp mounting portion that is disposed on an upper portion of the headlamp housing; an extending contact portion that is continuous with the headlamp mounting portion; a headlamp pressing portion that is disposed below the headlamp mounting portion; a first bracket having a first end portion and a second end portion that is continuous with the first end portion, the first end portion being attached to a body mount of the vehicle body together with the headlamp mounting portion, the second end portion being attached to the headlamp pressing portion; and a second bracket having a first portion and a second portion that is continuous with the first portion, the first portion being attached to the body mount together with the headlamp mounting portion and the first end portion, the second portion being close to the extending contact portion. Therefore, when the front surface of the headlamp is subjected to a load (impact) due to a low speed collision, the load is transferred from the headlamp housing to the vehicle body through the first bracket, whereby a backward movement of the headlamp can be restrained.

When the headlamp starts rotating upward due to the load (impact), the extending contact portion of the headlamp housing rotates and contacts the second portion of the second bracket, whereby the upward rotation of the headlamp can be restrained.

Thus, the first bracket, which receives a load from the front side, and the second bracket, which receives a load in the direction of rotation, for restraining displacement of the headlamp (change in the angle of the optical axis) are independently provided in the headlamp. Therefore, each of the first bracket and the second bracket may have a thickness that is appropriate for receiving the load to which it is subjected, whereby the weight of the headlamp can be reduced.

According to the embodiment of the present invention, the headlamp mounting portion is disposed in front of the body mount, and the second portion of the second bracket and the extending contact portion are disposed behind the body mount. Therefore, with respect to the body mount, the headlamp mounting portion is disposed on the front side of the vehicle, and the second portion of the second bracket and the extending contact portion are disposed on the back side of the vehicle. As a result, when an obstacle collides with the front surface of the headlamp, the extending contact portion rotates and contacts the second portion of the second bracket, and thereby transfers a rotation component of the road. Accordingly, the second bracket can efficiently receive (transfer and spread) the load.

The vehicle headlamp according to the embodiment of the present invention is preferably used in a vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle headlamp to project light forward from a vehicle, comprising:
   a headlamp housing supported by a vehicle body and supporting a lens through which the light passes;
   a headlamp mounting portion disposed on an upper portion of the headlamp housing;
   an extending contact portion continuous with the headlamp mounting portion;
   a headlamp pressing portion disposed below the headlamp mounting portion;
   a first bracket having a first end portion and a second end portion that is continuous with the first end portion, the first end portion being attached to a body mount of the vehicle body together with the headlamp mounting portion, the second end portion being attached to the headlamp pressing portion; and
   a second bracket having a first portion and a second portion that is continuous with the first portion, the first portion being attached to the body mount together with the headlamp mounting portion and the first end portion, the second portion being close to the extending contact portion.

2. The vehicle headlamp according to claim 1,
wherein the headlamp mounting portion is disposed in front of the body mount, and
wherein the second portion of the second bracket and the extending contact portion are disposed behind the body mount.

3. The vehicle headlamp according to claim 2,
wherein the extending contact portion is capable of contacting the second portion of the second bracket.

4. The vehicle headlamp according to claim 1,
wherein the second bracket has a thickness smaller than a thickness of the first bracket.

* * * * *